United States Patent
Baumgartner et al.

(10) Patent No.: US 8,616,350 B2
(45) Date of Patent: Dec. 31, 2013

(54) METHOD FOR ACTUATING A WET MULTIPLE DISC BRAKE AND A WET MULTIPLE DISC BRAKE

(75) Inventors: Johann Baumgartner, Moosburg (DE); Steffen Geissler, Hallbergmoos (DE); Aleksandar Pericevic, Munich (DE); Robert Trimpe, Wessling (DE); Robert Gruber, Pfaffing (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 12/841,841

(22) Filed: Jul. 22, 2010

(65) Prior Publication Data
US 2011/0005870 A1  Jan. 13, 2011

Related U.S. Application Data

(63) Continuation of application No. PCT/EP2009/000135, filed on Jan. 13, 2009.

(30) Foreign Application Priority Data

Jan. 22, 2008 (DE) ........................ 10 2008 005 434

(51) Int. Cl.
*B66D 5/02* (2006.01)
(52) U.S. Cl.
USPC ........................................... 188/264 D
(58) Field of Classification Search
USPC ......... 188/264 D, 264 E, 264 CC, 71.5, 71.6; 192/70.12, 113.34
See application file for complete search history.

(56) References Cited

U.S. PATENT DOCUMENTS

| | | | | |
|---|---|---|---|---|
| 2,955,682 A | * | 10/1960 | Heck et al. | 188/71.5 |
| 3,670,854 A | * | 6/1972 | Maci | 188/71.6 |
| 4,271,937 A | | 6/1981 | Hatch et al. | |
| 4,624,353 A | | 11/1986 | Sailer et al. | |
| 5,342,120 A | * | 8/1994 | Zimmer et al. | 303/113.2 |
| 6,250,436 B1 | | 6/2001 | Oikawa et al. | |
| 6,907,973 B2 | | 6/2005 | Schiele et al. | |
| 7,018,004 B2 | * | 3/2006 | Chen et al. | 303/193 |
| 2003/0051967 A1 | | 3/2003 | Kitaori et al. | |
| 2006/0087173 A1 | * | 4/2006 | Kajiyama et al. | 303/3 |
| 2007/0236082 A1 | * | 10/2007 | Sturgess | 303/114.1 |

FOREIGN PATENT DOCUMENTS

| | | |
|---|---|---|
| DE | 101 16 848 A1 | 10/2002 |
| DE | 102 30 183 A1 | 1/2004 |
| DE | 103 07 657 A1 | 9/2004 |

(Continued)

OTHER PUBLICATIONS

Japanese Office Action dated Feb. 19, 2013 (four (4) pages).

(Continued)

*Primary Examiner* — Anna Momper
(74) *Attorney, Agent, or Firm* — Crowell & Moring LLP

(57) ABSTRACT

A method is provided for actuating a wet multiple disc brake, running with cooling oil, especially for a road vehicle. Stationary and rotating radially oriented discs are pressed against one another during braking while overcoming a clearance. The method is characterized in that once the brake is released, the discs associated with each other are separated from each other to such an extent as to form an oil-free or substantially oil-free clearance, wherein the clearance is minimized prior to braking by advancing the discs towards each another.

14 Claims, 1 Drawing Sheet

(56) References Cited

FOREIGN PATENT DOCUMENTS

| | | | |
|---|---|---|---|
| DE | 10 2004 035 262 A1 | 2/2006 |
| DE | 10 2006 060 470 A1 | 7/2007 |
| EP | 0 143 898 A1 | 6/1985 |
| JP | 51-60867 | 5/1976 |
| JP | 6-115413 A | 4/1994 |
| JP | 8-326789 A | 12/1996 |
| JP | 11-5528 A | 1/1999 |
| JP | 2000-46082 A | 2/2000 |
| JP | 2003-74591 A | 3/2003 |

OTHER PUBLICATIONS

Correspondence dated May 10, 2013 (thirteen (13) pages).
International Search Report dated Mar. 23, 2009 with English translation (four (4) pages).
German Office Action dated Jan. 12, 2009 with English translation (eight (8) pages).

* cited by examiner

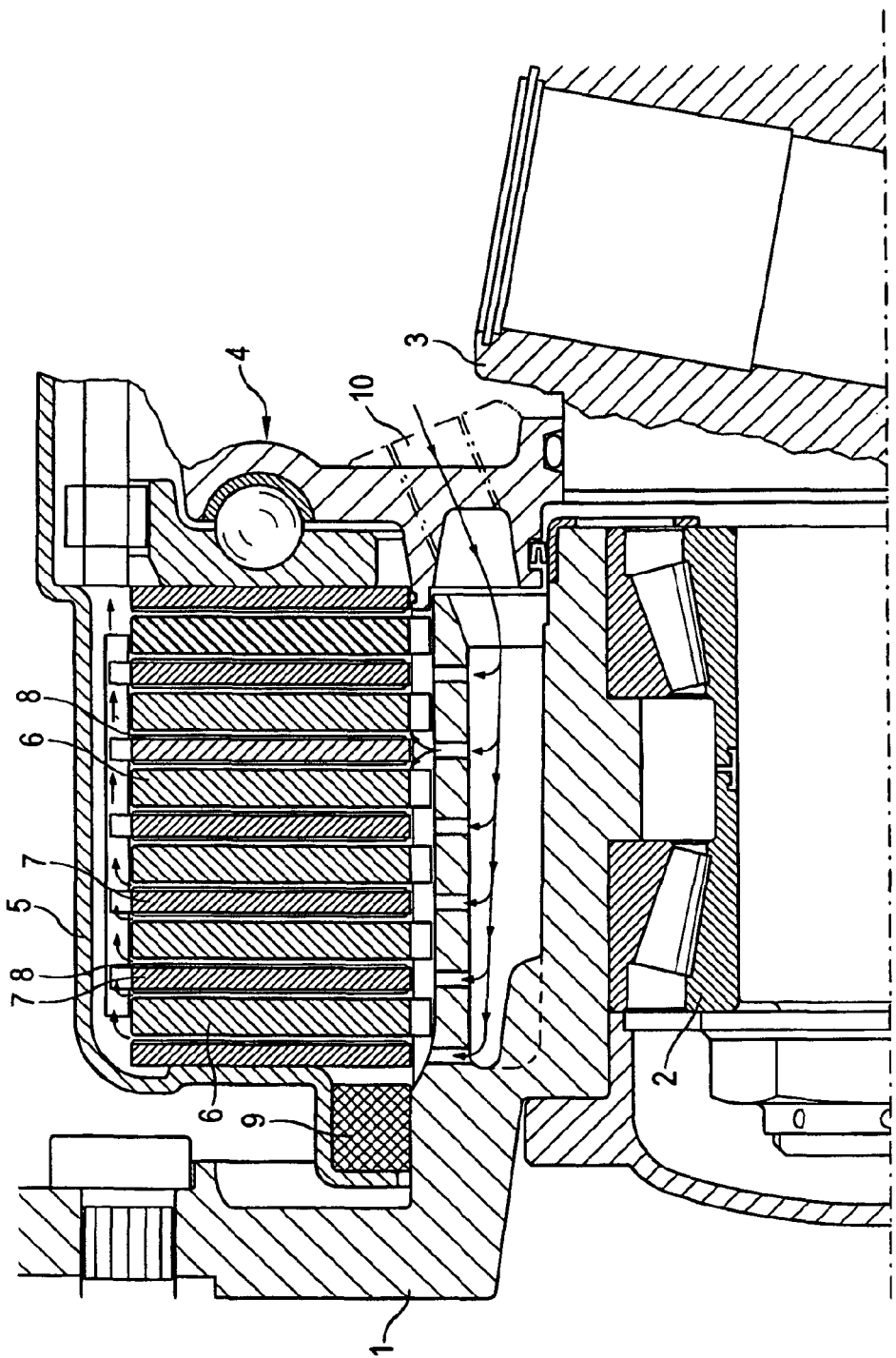

METHOD FOR ACTUATING A WET MULTIPLE DISC BRAKE AND A WET MULTIPLE DISC BRAKE

CROSS-REFERENCE TO RELATED APPLICATIONS

This application is a continuation of PCT International Application No. PCT/EP2009/000135, filed Jan. 13, 2009, which claims priority under 35 U.S.C. §119 from German Patent Application No. DE 10 2008 005 434.8, filed Jan. 22, 2008, the entire disclosures of which are herein expressly incorporated by reference.

BACKGROUND AND SUMMARY OF THE INVENTION

The invention relates to a disc brake and a method for actuating a wet multiple disc brake that is run wet by use of cooling oil, especially for a road vehicle, wherein stationary and rotating radially aligned discs are pressed against one another in the event of a braking operation, closing a release clearance in the process.

Wet multiple disc brakes have advantages in terms of robustness, brake lining service life and environmental pollution over dry brakes, e.g. disc brakes of the type that has hitherto been used predominantly in road vehicles, e.g. in heavy commercial vehicles.

These dry friction brakes are subject to relatively high wear and produce abraded material from the brake, which contributes to not inconsiderable dust pollution, especially fine dust pollution, of the environment.

Moreover, brake lining (pad) wear necessitates corresponding maintenance work, which gives rise to additional operating costs.

In addition, the known disc brakes are prone to faults in the area of construction sites and in off-road use owing to their open construction, and require additional protective measures in terms of enclosures.

In special trucks, and in heavy construction machines, tractors and the like, on the other hand, the primary brake types used are wet multiple disc brakes, in which the heat which arises in association with braking and the abraded brake lining material mentioned is carried away by cooling oil. Such wet multiple disc brakes show little wear and are operated at low temperatures.

Wet multiple disc brakes are usually combined with an axle transmission, and the oil for the axle transmission is therefore also used as a cooling oil for the operation of the multiple disc brake. Although this simplifies the installation of the brake, it also results in considerable disadvantages. For example, the service life of the axle transmission is reduced by the abraded brake lining material in the cooling oil and by the increase in the oil temperature. Since forced circulation through the discs is not provided and heat dissipation from the axle is furthermore limited, the brake exhibits phenomena associated with overheating in the event of very sharp and frequent braking, causing damage to the oil and a consequent risk of severe mechanical damage to the brake and the axle transmission.

Moreover, the high viscosity of the oil between the friction surfaces of the discs, i.e. the oil in the release clearance, gives rise to frictional losses, even when the brake is released, owing to the internal friction of the oil, and these losses lead to permanently increased braking resistance and correspondingly increased energy consumption during the operation of the vehicle.

These frictional losses form a permanently present residual torque that has to be overcome and, in particular, is dependent on the size of the release clearance, that is to say the spacing between the mutually facing friction surfaces of the discs.

Although increasing this release clearance has already been tried, in order by this means to permit the oil to flow out of the release clearance, the release clearance dimensions proposed are not acceptable for relatively fast-moving road vehicles. Thus, for example, one recommendation was to make the release clearance at least 0.2 mm per friction contact, although this was admittedly for multiple disc brakes which are used in heavy construction machines, tractors, tracked vehicles or the like, i.e. in correspondingly slow-moving vehicles.

For a multiple disc brake with, for example, 10 rotating discs, of the type used on road vehicles, the resulting total release clearance is 20 times the individual release clearance, which means a total release clearance of 4 mm. The resulting increase in the length of the response time of the brake is not acceptable, particularly in light of safety considerations, and therefore the increase in the release clearance has not been implemented to the extent desired for operational reasons.

It is the underlying object of the invention to develop a method and a wet multiple disc brake of the type in question in such a way that its operating capability is improved and its operating behavior is optimized.

This object is achieved by a method for actuating a multiple disc brake that is run wet by use of cooling oil, especially for a road vehicle, wherein stationary and rotating radially aligned discs are pressed against one another in the event of a braking operation, closing a release clearance in the process. After the brake is released, the mutually associated discs are separated from one another by an amount such that an oil-free or largely oil-free release clearance is formed. The release clearance is minimized by advancing the discs before a braking operation. A multiple disc brake according to the invention includes a control device provided by which the discs can be adjusted toward a minimized release clearance before a braking operation.

By way of the invention, a maximum release clearance is obtained during free running, with the result that no oil film with the disadvantages described in relation to the prior art is formed between the mutually facing friction surfaces of the discs.

When a braking operation is imminent, readiness for braking is established by reducing the release clearance until the discs are in slight contact.

To reduce the response time that results from the maximum release clearance, processes that precede the actual brake actuation and that can be detected by the brake system and/or signals are detected and evaluated, ensuring that readiness for braking has already been established before the brake pedal is actuated.

For example, the driver's desire for a reduction in the speed of travel can be detected each time the gas pedal is released by means of a pedal value transmitter arranged on the pedal, and the release clearance can be reduced even at this stage in expectation of a subsequent brake actuation.

In this way, the response behavior of the multiple disc brake is actually improved over conventionally operated brakes, despite the large release clearance. Thus, for example, times for transferring the foot from the gas pedal to the brake pedal in the range of from 0.15 to 0.25 seconds are known in passenger vehicles. In the case of heavy commercial vehicles, this time tends to be somewhat longer owing to the longer lever travels.

Using this lead time, it is possible in the case of an electromechanically actuated brake, for example, which requires 50 ms to close a release clearance of about 1 mm, to implement a release clearance of more than 5 mm without increasing the response delay of the brake.

In evaluating the pedal value signal of the gas pedal, it is also possible to analyze the degree of probability of the occurrence of a brake actuation and to derive therefrom different settings of the release clearance as appropriate to the situation.

When the gas pedal is released relatively slowly, which indicates that there is no immediate dangerous situation, it is appropriate to reduce the release clearance merely to a normal size, from 5 mm to 1 mm, for example.

When the speed with which the gas pedal is released exceeds a predetermined value and a subsequent emergency braking operation is thus probable, the release clearance can be completely eliminated, slight contact between the discs being accepted, if appropriate.

As an alternative or complementary measure to the evaluation of the pedal value signal from the gas pedal, the information from an existing distance warning system can be used in accordance with the invention to prepare for a braking operation. If a rapid or impermissible reduction in the distance with respect to a preceding vehicle is detected or an obstacle is suddenly encountered, the available information from the distance warning system can be used to reduce or completely eliminate the release clearance as appropriate to the situation. In the same way, it is also possible to take into account signals from vehicle stability control systems (e.g. ESP).

Given a combination of several signals which make it possible to infer the imminent necessity of a braking operation, e.g. signals from the pedal value transmitter mentioned plus a distance warning signal, it is possible to predict the probability of a braking operation being required with particularly high accuracy and thus to implement the adjustment of the release clearance as appropriate to the situation.

The reduction in the release clearance toward its minimization before the actual braking operation is performed in any situation which suggests a braking operation, and this is then preferably maintained for a minimum period, e.g. 10 seconds. After this predetermined maintenance time or in the event of a renewed actuation of the gas pedal, the release clearance is reset to the original larger size corresponding to the unbraked driving state.

According to an advantageous development of the invention, the oil supply to the discs is interrupted in non-braking phases, and the cooling oil is thus thrown out of the widened release clearances, thereby almost completely eliminating the danger of the fluid friction described.

The maximum possible braking energy during a braking operation is decisive for the dimensioning of the discs. Thus, for example, what is referred to as "heat crack braking" represents a maximum demand for a heavy truck (permitted total weight of 18 tons, two axles). This braking operation is used on a friction dynamometer to simulate the fully laden vehicle being driven downhill at top speed. At a braking torque of 2800 Nm and a speed of travel of 85 km/h maintained for 40 seconds, the braking energy at each wheel is 5.0 MJ. This energy has to be temporarily stored in the rotating discs directly absorbing the frictional heat since heat dissipation via the coolant takes a considerably longer time.

In these circumstances, the thermally active mass of the rotor system must be large enough to ensure that the temperature of the components does not exceed 250° C. in order to avoid damage to the oil.

In the example mentioned, the required mass of the rotor discs is 40 kg when the stationary discs, i.e. the stator discs, are fitted with organic linings since the insulating effect of the latter hinders the absorption of heat into the disc. Between brake actuations, heat is dissipated principally by the cooling oil.

The design of the cooling system is determined by the average braking heat that can arise in the event of successive braking operations. For design, use is made of test programs which have proven their worth in previous brake development.

In the case of the two-axle trucks mentioned with a permitted total weight of 18 tonnes, these are, for example, as follows:

|  | Energy per brake operation | Energy per hr. driving time |
|---|---|---|
| Heat crack test (2.8 kNm; 85 km/h; 40 s, cycle time 12 min) | 5.0 = MJ | 25 MJ/h |
| Drastic braking test (stops from 90 km/h, cycle time 5 min) | 1.55 MJ | 18.6 MJ/h |
| Hot series (60 successive braking operations at 2 min intervals) | 0.67 MJ | 20.1 MJ/h |
| Rossfeld test (mountain descent as misuse test; 1030 m altitude difference; 30 km/h; 22 min driving time; about 110 brake operations) | 0.63 MJ | 69.2 MJ/h |

The conditions of the Rossfeld test are decisive for the dimensioning of the cooling system. This gives a cooling capacity requirement of about 20 kW per brake. In this extreme test, the oil supply is active for the entire duration of driving.

For the necessary cooling down time, the heat crack test in turn forms the maximum demand. The large amount of heat absorbed necessitates a cooling down time of about 6 min to allow cooling down to 50° C.

In the case of slight adaptive braking, which accounts for more than 90% of all braking activity, only a short oil supply run-on time is required, thus making it possible in normal operation to avoid the frictional losses caused by the cooling oil.

In the case of an oil pump driven by an electric motor, the oil supply can be interrupted by switching off said pump. On the other hand, valve control is necessary if, even after the oil has run out of the brake housing, the cooling oil that is then in the reservoir is to be cooled down still further. In this case, a multi-way valve directs the oil flow into a cooling circuit from the reservoir to a heat exchanger or from the heat exchanger to the reservoir. In this way, the non-braking phases can be used for improved cooling without causing additional frictional losses in the brake.

The switching off of the oil pump and/or control of the oil supply can be performed as required by the existing brake control system in accordance with the braking activities and the resulting braking heat to be dissipated.

Other objects, advantages and novel features of the present invention will become apparent from the following detailed description of one or more preferred embodiments when considered in conjunction with the accompanying drawing.

BRIEF DESCRIPTION OF THE DRAWING

The single FIGURE shows a portion of a multiple disc brake in a sectioned side view.

DETAILED DESCRIPTION OF THE DRAWING

The FIGURE depicts a wet multiple disc brake, which is integrated into a wheel hub 1 of a road vehicle, the wheel hub 1 being mounted rotatably on a wheel bearing 2 of an axle stub 3.

Connected to the axle stub 3 in a manner secure against rotation is a stator 4, which has a plurality of radially extending stationary discs 6 arranged parallel to and at a distance from one another, arranged between which there is in each case a rotating disc 7 connected in a manner secured against rotation to the wheel hub 1. The discs 6, 7 are located in a stator housing 5, which is sealed off from the wheel hub 1 by way of a seal 9.

On their mutually facing sides, at least one of the respective discs 6, 7 has a friction lining which, in the event of a braking operation, makes frictional contact with the facing surface of the other disc 6, 7.

Via a cooling oil port 10, cooling oil is passed between the discs 6, 7 and carried away therefrom in the direction of the arrows, this cooling oil on the one hand carrying away the abraded material from the friction linings 8 which arises during braking and on the other hand carrying away the frictional heat which arises.

According to an embodiment of the invention, the mutually associated discs 6, 7 are separated from one another after the brake is released by an amount such that an oil-free or largely oil-free release clearance is formed between the discs 6, 7. Before a braking operation, the release clearance is minimized to such an extent by advancing the discs that it is possible to press the discs against one another rapidly, i.e. to brake rapidly.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a multiple disc brake for a road vehicle, the multiple disc brake having stationary and rotating radially aligned discs that press against one another in an event of a braking operation, the multiple disc brake being run wet by use of cooling oil, the method comprising the acts of:
   releasing the brake after a braking operation;
   after releasing the brake, carrying away oil disposed between the aligned discs and separating the aligned discs from one another by an amount sufficient to avoid formation of a cooling oil film between mutually facing friction surfaces of the aligned discs; and
   advancing the aligned discs to minimize a substantially oil-free release clearance before another braking operation.

2. The method according to claim 1, further comprising the acts of:
   determining an expected braking operation; and
   performing the advancing of the aligned discs based on the expected braking operation.

3. The method according to claim 2, further comprising the acts of:
   detecting a reduction in a speed of travel of the road vehicle; and
   performing the advancing of the aligned discs based on the reduction in the speed of travel.

4. The method according to claim 1, further comprising the acts of:
   detecting a reduction in a speed of travel of the road vehicle; and
   performing the advancing of the aligned discs based on the reduction in the speed of travel.

5. The method according to claim 4, wherein the reduction in the speed of travel is detected through a release of a gas pedal of the road vehicle.

6. The method according to claim 1, further comprising the acts of:
   detecting a release speed of a gas pedal of the road vehicle; and
   performing the advancing of the aligned discs as a function of the release speed of the gas pedal.

7. The method according to claim 1, further comprising the acts of:
   obtaining information from at least one of a pedal value transmitter, a distance warning system, and a vehicle stability control system; and
   performing the advancing of the aligned discs as a function of said information obtained.

8. The method according to claim 1, further comprising the acts of:
   reversing the advancing of the aligned discs after at least one of a predetermined wait time and actuation of a gas pedal of the road vehicle.

9. The method according to claim 1, wherein the cooling oil film is produced by a supply of the cooling oil, and further comprising the acts of:
   switching-off the supply of the cooling oil after releasing the brake; and
   switching-on again the supply of the cooling oil before the other braking operation and while advancing the aligned discs.

10. The method according to claim 9, wherein the cooling oil is cooled separately from the multiple disc brake after the supply of the cooling oil is switched off.

11. A multiple disc brake for a road vehicle for performing the method of claim 1, the multiple disc brake running wet by use of said cooling oil.

12. A multiple disc brake for a road vehicle for performing the method of claim 2, the multiple disc brake running wet by use of said cooling oil.

13. A multiple disc brake for a road vehicle for performing the method of claim 4, the multiple disc brake running wet by use of said cooling oil.

14. A multiple disc brake for a road vehicle for performing the method of claim 3, the multiple disc brake running wet by use of said cooling oil.

* * * * *